United States Patent

[11] 3,610,288

| [72] | Inventor | Donald G. Carr |
| | | Franklin Park, Ill. |
| [21] | Appl. No. | 867,288 |
| [22] | Filed | Oct. 17, 1969 |
| [45] | Patented | Oct. 5, 1971 |
| [73] | Assignee | Amsted Industries Incorporated |
| | | Chicago, Ill. |

[54] COMBINED PIPE CONNECTOR AND PIPE CAP
9 Claims, 6 Drawing Figs.

[52] U.S. Cl. .................................................. 138/96 R,
285/383, 117/4, 285/417, 285/423
[51] Int. Cl. ........................................................ B65d 59/00
[50] Field of Search ............................................... 138/89, 91,
96, 96 T; 285/369, 3, 417, 4, 423, 383, DIG. 7;
117/4, 94; 287/108; 29/2.1, 2.25; 83/371

[56] References Cited
UNITED STATES PATENTS

| 528,167 | 10/1894 | Jones .......................... | 287/108 |
| 2,249,848 | 7/1941 | O'Brien ..................... | 287/108 |
| 2,727,651 | 12/1955 | Mickelson ................. | 138/96 T |
| 3,187,777 | 6/1965 | Ashlock ...................... | 138/96 |

FOREIGN PATENTS

| 647,912 | 12/1950 | Great Britain ............... | 287/108 |

Primary Examiner—Dave W. Arola
Attorneys—Walter L. Schlegel, Jr. and Norvell E. Von Behren ABSTRACT: A combination device for connecting together the adjacent ends of two pipes prior to passing the pipes through a pipe cleaning and/or coating process. At the completion of the coating process, the device is cut substantially in half to form a pair of removable protective pipe caps which are mounted on the ends of the newly coated pipe.

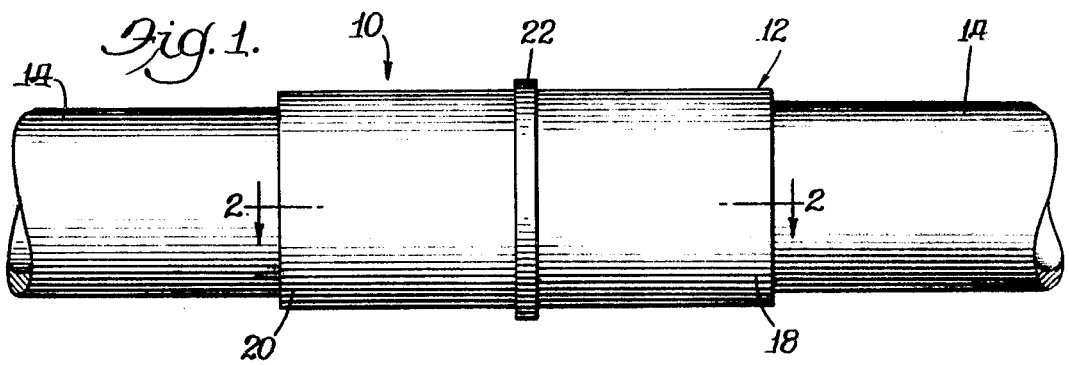
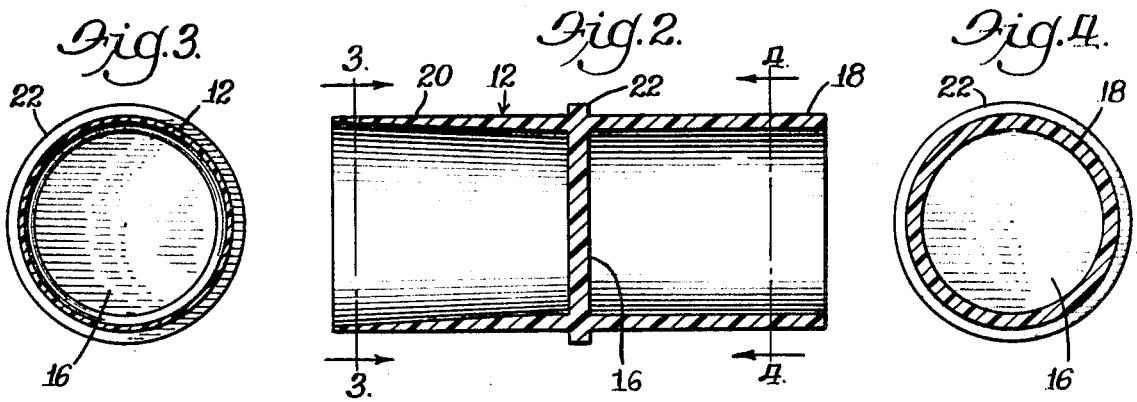
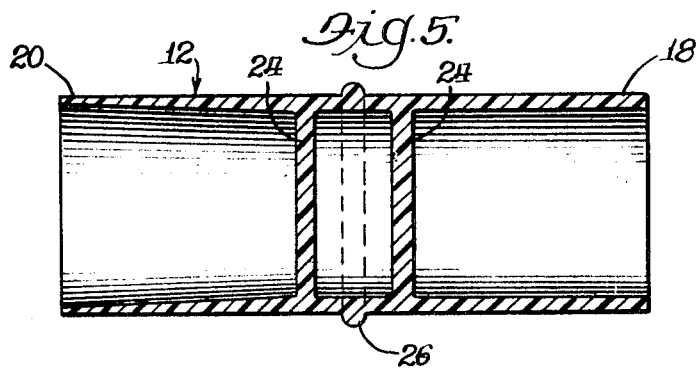
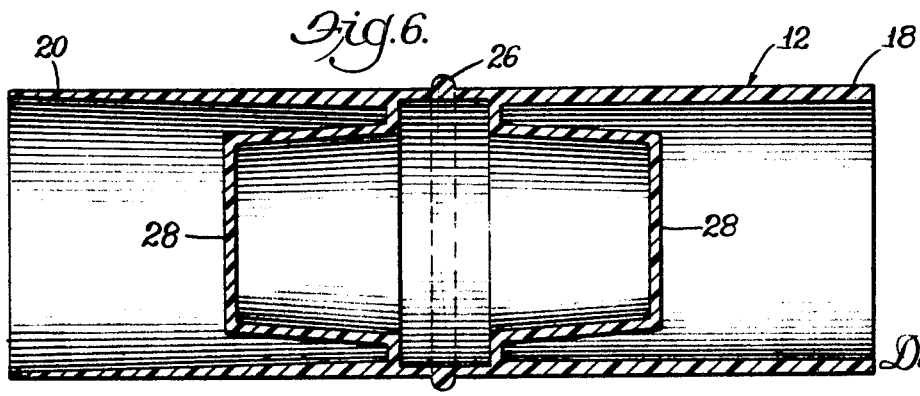

COMBINED PIPE CONNECTOR AND PIPE CAP

BACKGROUND OF THE INVENTION

This invention relates generally to a device for use in the pipe cleaning and/or coating field and more particularly to a new and novel combination pipe connector and pipe cap that may be used to join together adjacent lengths of pipes and when cut apart to subsequently cap the pipes with the same device.

In the process for coating individual lengths of pipe, the pipe to be coated was first sent through a shot blast cleaning operation to remove mill scale, rust and other foreign particles and to stipple the pipe surface to provide a better surface for bonding the pipe coating to the steel. During this step in the coating operation, shot often was deposited inside the pipe and had to be blown out by a man with compressed air prior to entering the mastic coater.

After being shot cleaned, the individual lengths of pipe were then initially joined together prior to being fed into the pipe coating process. The prior art device for joining these pipes together was often an expensive metal coupling which was inserted internally into the ends of the pipe to be joined and was often an expensive metal coupling which was inserted internally into the ends of the pipe to be joined and was subsequently cut free of the plastic coating and knocked out of the pipe by hand after the coating process.

In order to prevent the coating material from adhering to the ends of the pipe which were subsequently threaded or welded in the field by the purchaser, a long series of steps had to be undertaken prior to and after completion of the coating process to insure the cleanliness of the pipe ends. After the pipes were joined together as beforementioned, a protective tape was hand applied over the coupling joints to prevent the mastic, used in the coating process from contracting the pipe ends and from entering into the pipe and contaminating the pipe insides.

Since the first layer of tape often rolled back and admitted mastic, a second layer of narrow tape was often applied over the lead edge of the first tape layer as double protection against mastic penetrating into the pipe joint.

At the completion of the tape wrapping process, which often took two men to complete, the two sections of coupled pipe were passed through the coating process which included in order: a mastic flood coater, a wiper ring, an extruder crosshead, a water quench, a high-voltage detector, and an imprinting station. After leaving the final station in the coating process, the joined pipe was separated at the metal coupling and the coupling was removed as beforementioned.

Subsequently, the wrapping at two separated pipe ends was cut back by hand and any mastic remaining on the pipe ends was removed by solvent. This step often required considerable labor to remove the tape and to use the solvent to clean the pipe to the required coating cut back distance necessary for field welding. When the purchaser specified, protective ends caps were then applied to the pipe ends prior to bundling the pipe for shipment.

SUMMARY OF THE INVENTION

In order to overcome the problems inherent in the prior art process beforementioned there is provided herein a new and novel combined pipe connector and pipe cap device which may be used for joining together the adjacent ends of the two pipes prior to passing the pipes through the pipe cleaning and/or coating process.

The new and novel device described herein is also used as a pipe cap to cover the ends of the cleaned and/ or coated pipe as a means of protecting these ends. Also disclosed is a new and novel method of cleaning and/or coating pipe using the combination connector-cap which greatly simplifies the lengthy pipe cleaning and/ or coating operation.

Accordingly, it is an object of this invention to provide a new and novel device for joining pipe together which may also be used as a protective pipe cap when the pipe is stored.

Yet, another object is to provide a new and novel combined pipe connector and pipe cap which contains means for actuation a cut off mechanism to cut the combined device to form a pipe cap.

These and other objects and advantages will become readily apparent from a study of the attached drawing and from a reading of the description of the preferred embodiment.

BRIEF DESCRIPTION OF THE DRAWING

FIG. 1 is a side elevational view of the combined pipe connector and end cap shown attached to the ends of two pieces of pipe;

FIG. 2 is a cross-sectional view of the invention taken along line 2—2 of FIG. 1;

FIG. 3 3–a cross-sectional view of the invention taken along line 3–3 of FIG. 2;

FIG. 4 is a cross-sectional view of the invention taken along line 4–4 of FIG. 2;

FIG. 5 is a cross-sectional view of a modification of the invention for high-speed pipe-coating lines taken along line 2–2 of FIG. 1; and FIG. 6 is a cross-sectional view of a modification of the invention, for larger sizes of pipe taken along line 2—2 of FIG. 1.

DESCRIPTION OF THE PREFERRED EMBODIMENT

Referring now to the drawings in general and particularly to FIGS. 1–4, there is shown generally at 10 the combined pipe cap device of the invention which comprises a cylindrical shaped sleeve 12 designed to fit snugly over the adjacent ends 14 of two pipes prior to passing the pipes through a pipe coating process.

Formed across the interior of the sleeve 12 is at least one wall 16 for positioning the sleeve 12 on the ends 14 of the pipes to be joined in such a manner that substantially the same length of each pipe and is contained within each side of the sleeve 12. The device as shown may be formed from an elastic material such as polyethylene and is designed so that one end 18 of the sleeve 12 has a uniform wall thickness so that the connector will fit smugly over the lead pipe end thereby preventing mastic from entering the pipe while going through the flood coater and upper ring assembly.

The other end 20 has a tapered wall section which is designed to readily accept the trailing pipe end and to simplify alignment of the pipes during the pipe joining operation. The device may also be formed of a semiconductive material, plastic or a plastic having a conductive coating in order to maintain electrical conductive paths for quality control checks during the coating operation.

The sleeve 12 has formed on the exterior central portion thereof an annular protuberance 22 which serves as a means for actuating an external cut off system. After the joined pipe leaves the pipe coating operation, the protuberance 22 may be used to actuate a saw to automatically cut the device 10 substantially in half through the protuberance 22 and the internal wall 16 to form the pair of protective pipe caps which are left intact on the ends of the pipe. The protuberance 22 can also be located at another location on the external surface without departing from the spirit and scope of the invention.

The actuating of the cutoff system could also be accomplished by the use of electronic sensors which could detect the thickness of the wall 16 separating the pipe ends 14 in the sleeve 12 and signal the cutoff mechanism to saw the sleeve 12 substantially in half through the wall 16.

Whenever the combination pipe connector and pipe cap is used on a high-speed coatingline, it would be necessary to construct the device with a pair of interior walls 24, as shown in FIG. 5, instead of one wall 16 as shown in FIG. 2. With the use of the pair of walls 24 sufficient latitude is allowed for variations in the speed of the coating line to insure that the cutoff mechanism operates to sever the sleeve 12 in half between the pair of walls 24 thereby leaving each pipe end 14 with a protective end cap as before mentioned. The modification shown in FIG. 5 also contains means for actuating the cutoff system in the form of an annular protuberance 26 as shown in the drawing formed on the exterior central portion of the sleeve 12 between the pair of walls 24. The annular protuberance 26 may also be located at another location on the external surface and not necessarily between the pair of walls 24.

Referring now to FIG. 6 of the drawing there is shown another modification of the invention wherein the pipe connector is used with larger size pipe. In the handling of large size pipe, usually 3 inches and larger, end hooks are often used to simplify picking and moving the pipe. With this size pipe it is apparent that the use of a pipe connector of the configuration shown in FIGS. 2 or 5 would preclude the use of ends hooks for picking up the pipe. Accordingly, the modification shown in FIG. 6 having a pair of recessed interior walls 28 in place of the single wall 16 of FIG. 2 or the pair of walls 24 of the FIG. 5 modification.

From this it can be seen that when the modification shown in FIG. 6 is used and the pipe connector is cut in half after the coating operation, the pipe ends will be left with a protective pipe caps having deep recessed end walls 28 sufficient to allow end hooks to be used without damaging the end cap.

From the foregoing it can be seen that there has been provided a new and novel combined pipe connector and pipe cap which may be used to improve the quality of the coated pipe and also may be used to increase the output of the pipe coating line while greatly decreasing the required manpower to complete the process. The device is designed for one time use as a pipe connector which also is used as a pipe cap to protect the normally bare pipe ends from rusting and to prevent contamination of the pipe interior while in storage at the plant site prior to erection.

By the use of the device, the method of coating pipe has been greatly simplified to basically a four step process of joining the pipe with the device, cleaning the pipe, coating the pipe and cutting the device in half to form a pair of protective pipe caps. A typical plant operation using the combination connector-cap of the invention would consist of installing the connector on previously brush cleaned ends of the pipe to be coated. The joined pipe would then be sent through a shot blast cleaning operation with the connector serving to prevent shot from entering the entering the interior of the pipes.

After the shot cleaning operation the pipe could be separated and stored on racks for a later coating operation or could be sent directly to the coating line for immediate coating. If the pipe is to be stored prior to coating, the two pieces of pipe that are joined together would be separated with the snug-fit end of the connector remaining on one of the pipes. When the pipes were ready for coating, they would be rejoined and sent through the various steps in the coating process whereupon they may be automatically cut in half at the connector thereby leaving the pipes with individual protective end caps. The pipe would then be collected and bundled for shipment to the field where it is readied for installation by the purchaser simply by removing the protective end caps leaving uncoated end portions of the pipe which may be easily welded in place.

By using the simplified method of coating as beforementioned with the new and novel pipe connector-cap device, the cost of cleaning and/or coating pipe may be greatly reduced since the prior art compressed air shot removal is eliminated, the expensive metal coupler also is eliminated as well as the time consuming joint tapping and separation of the pipes at the metal coupler. In addition, the new method with the new device eliminates the operation of removing the previously applied tape and removal of mastic remaining on the joints prior to installing protective end caps where specified.

From the foregoing it can be seen that there has been provided a new and novel combined pipe connector and pipe cap that may be used to connect together adjacent ends of two pipes prior to passing the pipes through the pipe cleaning and/or coating operation. The device serves to prevent mastic from entering the pipe and also serves as a protective end cap when subsequently cut in half at the end of the coating operation. While many changes may be made in the construction details without departing from the spirit and scope of the invention as defined in the accompanying claims, the invention is not to be limited to the exact matters shown and described since the preferred embodiment has been given by way of illustration only.

I claim:

1. A combined pipe connector and pipe cap for joining together the adjacent ends of the two pipes prior to passing the pipes through a pipe cleaning and/or coating process and for capping the ends of the pipe after the completion of the process, comprising:
   a. a cylindrical-shaped sleeve for fitting snugly over the ends of adjacent pipes to thereby effectively join the pipes together;
   b. a pair of walls formed across the interior of said sleeve at a spaced interval from each other and between the pipe ends at the central portion of said sleeve for positioning said sleeve on the ends of the pipe when said sleeve is used in a high-speed pipe-coating process so that substantially the same length of each pipe is contained within each side of said sleeve, each side of said sleeve being identical to the other side;
   c. said sleeve and said interior wall serving as a pair of protective pipe caps for the adjacent ends of the pipe whenever said sleeve is cut substantially in half while joining the pipes together after completion of the pipe coating process.

2. A combined pipe connector and pipe cap for joining together the adjacent ends of two pipes prior to passing the pipes through a pipe cleaning and/or coating process and for capping the ends of the pipe after the completion of the process, comprising:
   a. a cylindrical-shaped sleeve for fitting snugly over the ends of adjacent pipes to thereby effectively join the pipes together;
   b. at least one wall formed across the interior of said sleeve and between the pipe ends at the central portion of said sleeve for positioning said sleeve on the ends of the pipe so that substantially the same length of each pipe is contained the same length of each pipe is contained within each side of said sleeve;
   c. said sleeve and said interior wall serving as a pair of protective pipe caps for the adjacent ends of the pipe whenever said sleeve is cut substantially in half while joining the pipes together after completion of the pipe coating process; and
   d. said sleeve-containing means for actuating the external cutoff system to cut said sleeve and said wall substantially in half thereby forming the pair of protective pipe caps.

3. The combined pipe connector and pipe cap as defined in claim 2 wherein said actuating means comprises an annular protuberance formed on the external central portion of said sleeve at the location of said wall.

4. The combined pipe connector and pipe cap as defined in claim 2 wherein said actuating means comprises the interior wall serving to separate the end of the pipe and to actuate the external cutoff system.

5. A combined pipe connector and pipe cap for joining together the adjacent ends of two pipes prior to passing the pipes through a pipe cleaning and/or coating process and for capping the ends of the pipe after the completion of the process, comprising:
   a. a cylindrical-shaped sleeve for fitting snugly over the ends of adjacent pipes to thereby effectively join the pipes together;
   b. at least two walls formed across the interior of said sleeve at spaced intervals from the central portion and between the pipe ends at the central portion of said sleeve for positioning said sleeve on the ends of the pipe when said sleeve is used in a high-speed pipe-coating process so that substantially the same length of each pipe is contained within each side of said sleeve;

c. said sleeve and said interior walls serving as a pair of protective pipe caps for the adjacent ends of the pipe whenever said sleeve is cut substantially in half while joining the pipes together after completion of the pipe coating process; and d. said sleeve-containing means for actuating a cutoff system for a high-speed pipe-coating line to cut said sleeve substantially in half between said pair of walls thereby forming the pair of protective pipe caps.

6. The combined pipe connector and pipe cap as defined in claim 5 wherein said actuating means comprises an annular protuberance formed on the exterior central portion of said sleeve between said pair of walls.

The the combined pipe connector and pipe cap as defined in claim 5 wherein said actuating means comprises at least one of said two interior walls serving to separate the ends of the pipe and to actuate the external cutoff system.

8. The combined pipe connector and pipe cap as defined in claim 5 wherein said pair of walls are recessed away from each other to permit end hooks to be used to pick up larger size pipe without damaging the pipe cap.

9. A method for coating predetermined lengths s of pipe comprising the steps of:

a. joining the lengths of pipe together with a combined pipe connector and pipe cap device prior to cleaning the pipes;

b. cleaning the joined lengths of pipe in a pipe cleaning machine;

c. coating the cleaned joined lengths of pipe and the device in a pipe coating machine and d. cutting the device substantially in half to form the pipe caps for each end of the pipe length thereby providing a predetermined length of coated pipe having protective end caps installed thereon.